US006996964B2

(12) United States Patent
Maconachy et al.

(10) Patent No.: US 6,996,964 B2
(45) Date of Patent: *Feb. 14, 2006

(54) LETTUCE HARVESTING METHOD

(76) Inventors: Frank J. Maconachy, 507 San Vincente Cir., Salinas, CA (US) 93901; David Offerdahl, 1518 1st Ave., Salinas, CA (US) 93905; Chris Garnett, 118 St. Francis Way, Salinas, CA (US) 93906

( * ) Notice: Subject to any disclaimer, the term of this patent is extended or adjusted under 35 U.S.C. 154(b) by 0 days.

This patent is subject to a terminal disclaimer.

(21) Appl. No.: 11/130,386

(22) Filed: May 16, 2005

(65) Prior Publication Data

US 2005/0204716 A1     Sep. 22, 2005

Related U.S. Application Data

(63) Continuation of application No. 10/372,572, filed on Feb. 25, 2003.

(60) Provisional application No. 60/368,990, filed on Apr. 2, 2002.

(51) Int. Cl.
*A01D 45/00*     (2006.01)
(52) U.S. Cl. .................................................. 56/327.1
(58) Field of Classification Search ............... 56/14.9, 56/15.2, 212, 327.1, 328.1
See application file for complete search history.

(56) References Cited

U.S. PATENT DOCUMENTS

| | | | | |
|---|---|---|---|---|
| 3,678,677 A | * | 7/1972 | Miller et al. | 56/327.1 |
| 3,800,518 A | * | 4/1974 | Baggiolini et al. | 56/327.1 |
| 3,821,987 A | * | 7/1974 | Shepardson et al. | 171/61 |
| 3,914,923 A | * | 10/1975 | Arends | 56/63 |
| 4,257,218 A | * | 3/1981 | McRobert | 56/327.1 |
| 4,262,477 A | * | 4/1981 | Turold et al. | 56/327.1 |
| 4,294,063 A | * | 10/1981 | Bianchi | 56/16.4 R |
| 4,353,201 A | * | 10/1982 | Pierce et al. | 56/364 |
| 4,662,162 A | * | 5/1987 | Bettencourt et al. | 56/327.1 |
| 6,298,644 B1 | * | 10/2001 | Sandei | 56/327.1 |
| 6,415,592 B1 | * | 7/2002 | Borchard | 56/327.1 |
| 6,463,722 B1 | * | 10/2002 | de Groot | 56/12.9 |

* cited by examiner

Primary Examiner—Thomas B. Will
Assistant Examiner—Alicia Torres
(74) Attorney, Agent, or Firm—Jeffrey Weiss; Janine R. Novatt; Weiss, Moy & Harris, P.C.

(57) ABSTRACT

A mobile harvesting method, which permits the automated harvesting of produce, preferably lettuce. The apparatus consists in its most basic form of a vehicle having a bandsaw positioned at a front portion thereof, the blade of which is positioned to slice the lettuce head at the desired location. The apparatus further includes a conveyor that transports the harvested produce from the cutting site and onto the apparatus. Preferably, the apparatus additionally features a washing conveyor, washing station, inspection station, and elevator conveyor, to assist in the further processing of harvested produce.

1 Claim, 4 Drawing Sheets

LETTUCE HARVESTING METHOD

RELATED APPLICATION

This non-provisional application is a continuation and claims priority from U.S. patent application Ser. No. 10,372, 572, filed Feb. 25, 2003, which in turn claimed priority to provisional application No. 60/368,990, filed on Apr. 2, 2002.

FIELD OF INVENTION

This invention relates generally to apparatuses and methods for harvesting produce and, more specifically, to a mobile lettuce harvesting method adapted to permit the automated harvesting of lettuce heads.

BACKGROUND OF THE INVENTION

Generally, the harvesting of produce, including in particular lettuce, involves the manual removal of produce from the field. Typically, a farmworker will walk through a field with a cutting tool such as a knife, and manually detach the exposed lettuce head from its root. The lettuce head will then be delivered for further processing, perhaps to a conveyor belt on a self-propelled harvester travelling through the field alongside the worker.

There are several drawbacks with the prior art methods, however. They are labor-intensive and, because of the use of a sharp cutting implement by the workers, potentially dangerous. A need therefore existed to reduce the labor-intensity of the produce harvesting process, and also to make that process safer. Preferably, account should also be taken of other steps necessary in the harvesting process beyond the removal of the produce from the ground, including inspection, washing, and elevation of the produce to a container. The present invention satisfies this need and provides other, related advantages.

SUMMARY OF THE INVENTION

It is an object of the present invention to provide a mobile harvester method permitting automated harvesting of produce, including specifically lettuce.

It is a further object of the present invention to provide a mobile harvester method permitting automated harvesting of produce, and further having a conveyor belt, a washing station, and an elevator belt.

BRIEF DESCRIPTION OF THE PREFERRED EMBODIMENTS

In accordance with one embodiment of the present invention, a harvesting method is disclosed. The harvesting method comprises providing a mobile harvesting apparatus travelling on a plurality of wheels and powered by an engine; wherein a bandsaw is positioned at a front portion of a feed conveyor located on said mobile harvesting apparatus; wherein said bandsaw has an exposed cutting blade located at an appropriate height for harvesting produce; wherein a lift conveyor is positioned on said mobile harvesting apparatus so as to receive harvested produce exiting said feed conveyor; wherein said lift conveyor is slidably retained on said mobile harvesting apparatus; wherein said lift conveyor and said feed conveyor are rotatably coupled to each other, so that sliding of said lift conveyor adjusts a vertical position of said bandsaw; and harvesting produce with said bandsaw; receiving said harvested produce on said feed conveyor; and receiving said harvested produce, after it exists said feed conveyor, on said lift conveyor.

DETAILED DESCRIPTION OF THE PREFERRED EMBODIMENTS

Figure 1:
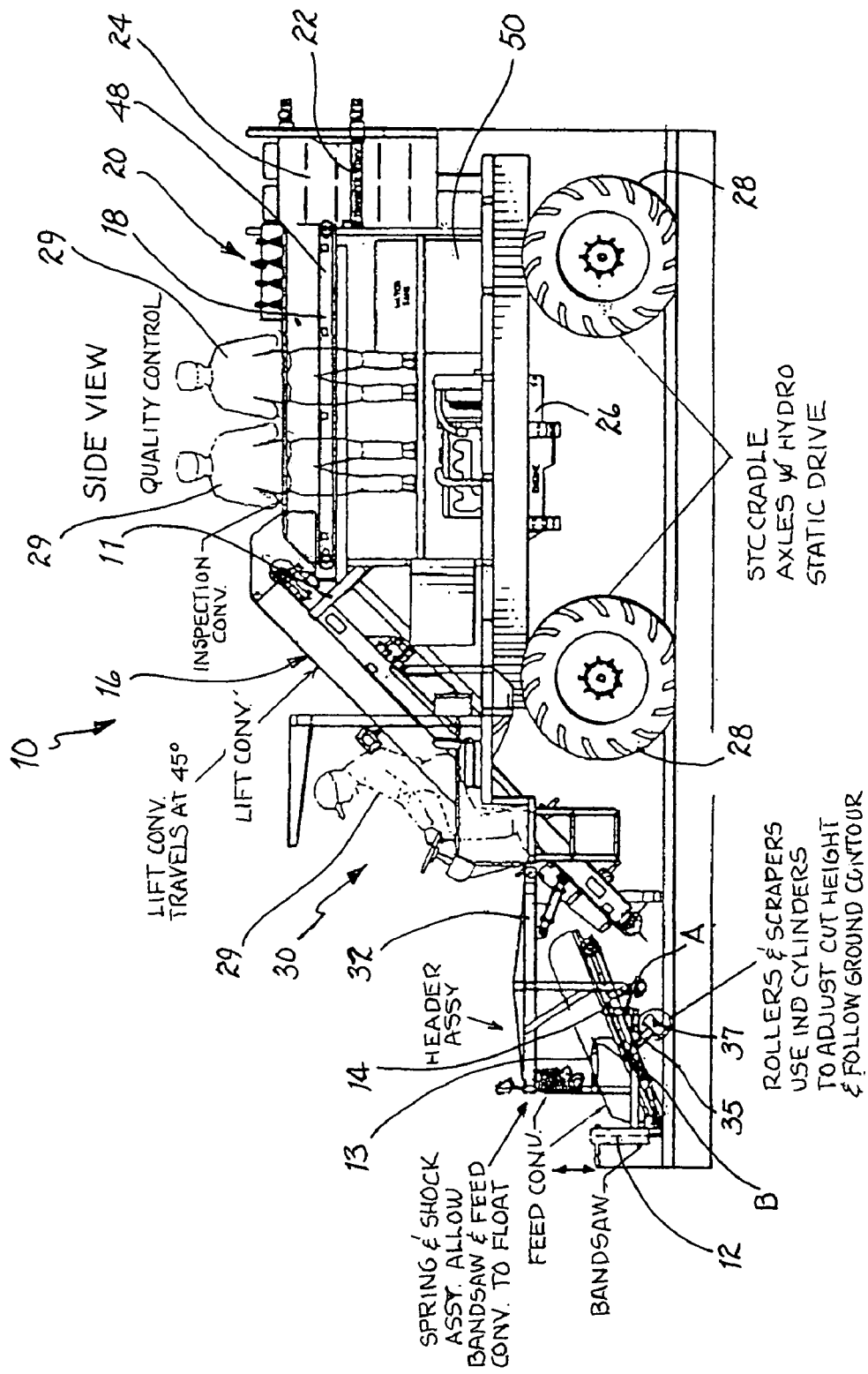
FIG. 1 is a side view of an embodiment of the lettuce harvesting apparatus used in the method of the present invention.

Referring first to FIG. 1, an embodiment of the lettuce harvesting apparatus 10 ("apparatus 10") of the present invention is shown. The apparatus 10 is intended to be used for the harvesting of produce. It is preferred to use the apparatus 10 to harvest lettuce, and in particular romaine lettuce.

The major components of the apparatus 10 include a bandsaw 12, a feed conveyor 14, a lift conveyor 16, a washing conveyor 18, a washing station 20, a transfer conveyor 22, and an elevator conveyor 24. The apparatus 10 is powered by an engine 26, rides on wheels 28, and may be driven by a person 29 sitting in driving compartment 30.

The bandsaw 12 is positioned at the front of the apparatus 10 as shown in FIGS. 1–4. The exposed cutting blade 15 of the bandsaw 12 is positioned at the base of the feed conveyor 14. The height of the bandsaw 12 and thus of the exposed cutting blade 15 is preferably adjustable, and the desired height setting will depend on the specific produce to be cut. Generally, with romaine, the height of the exposed cutting blade 15 will be set between 0.25" and 1.5" from the ground. The level of the bandsaw 12, and thus of the exposed cutting blade 15, is preferably also adjustable, as herein described.

Figure 4:
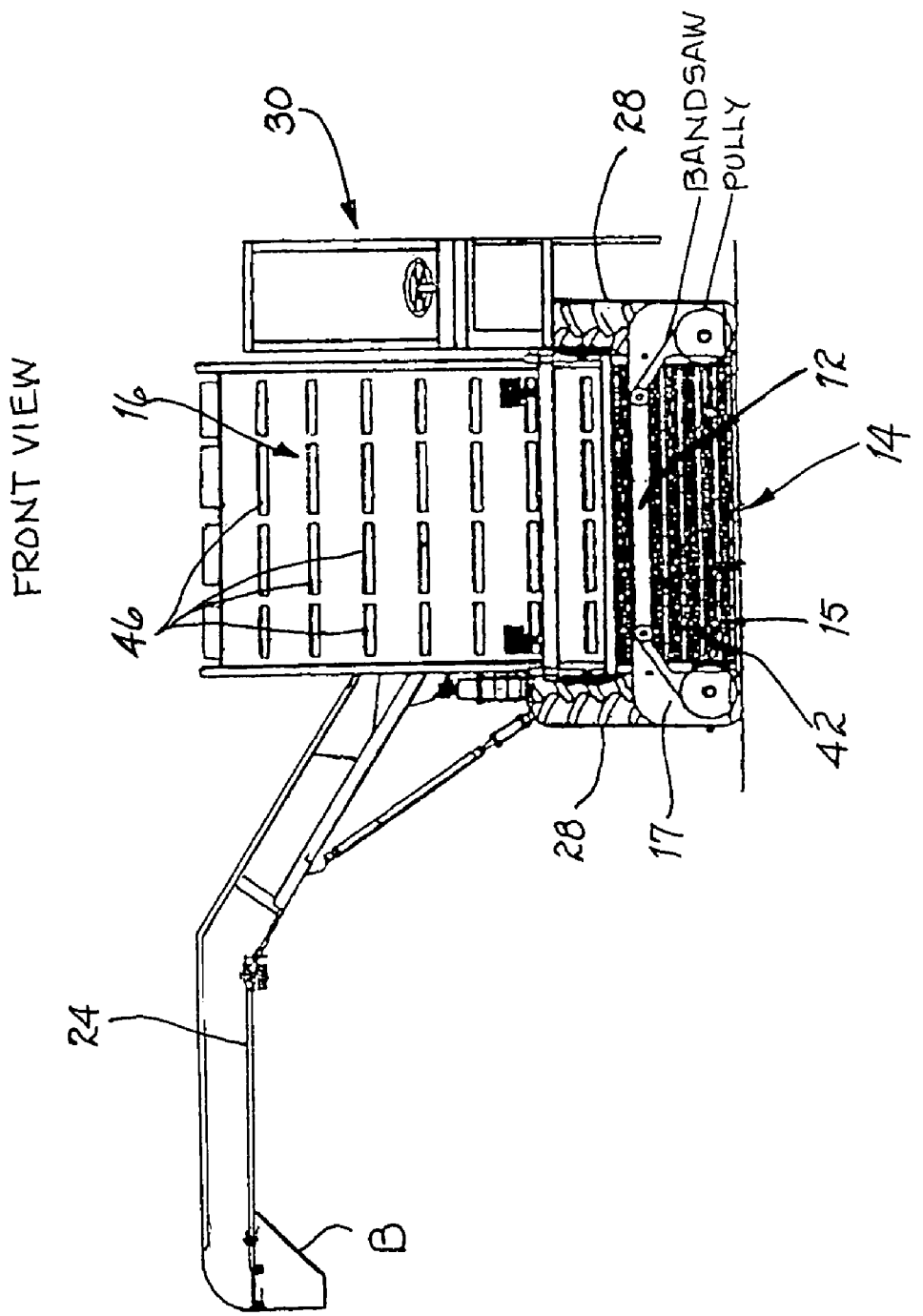
FIG. 4 is a front view of the lettuce harvesting apparatus used in the method of the present invention, illustrating in greater detail the bandsaw portion of the apparatus.

Preferably, the bandsaw 12 further comprises a housing 17, which conceals the cutting blade 15 after it passes across the area where it will be cutting the produce, and continues to loop upward and around. (The path of the cutting blade 15 is illustrated in FIG. 4.) The purpose of the housing 17 is to increase safety for persons who might be working with the apparatus 10. The bandsaw 12 is preferably powered hydraulically, though of course other powering means may be employed.

The feed conveyor 14 is coupled to the lift conveyor 16 with coupling arms 32, which coupling arms 32 are to travel in an upward and downward direction about point B, i.e., about the point at which they couple to the lift conveyor 16. The feed conveyor 14 preferably rides on five parallel rollers 34 (only one is shown), with the rollers 34 being positioned about axle 35 and with axle 35 being coupled at each end thereof to a substantially L-shaped member 37. Each substantially L-shaped member 37 rotates about point B, and is coupled at its second end (the first end being coupled to axle 35) to a hydraulic cylinder 13 (only one of which is shown). (It should be understood that fewer than five, or more than five, rollers 34 could be provided, and further that they could be positioned in a non-parallel configuration.) It is further preferred to position scrapers (not shown) above each roller 34, oriented so as to remove dirt or debris that adheres to the surface of the rollers 34 as the apparatus 10 travels through a field to be harvested.

The feed conveyor 14 is coupled to the coupling arms 32 with first vertical supports 36 and second vertical supports 38. The first vertical supports 36 include a spring and shock assembly 40 thereon, so as to permit upward and downward movement of the front portion of the feed conveyor 14, as indicated by the bidirectional arrow, in response to variations in the terrain over which the apparatus 10 travels.

The second vertical supports 38 are rotatably coupled below the surface of the feed conveyor 14 about point A, which is a centrally-located universal joint. As the front of the feed conveyor moves upward or downward—either by operation of the herein-described height adjustment mechanism or in response to terrain variations—the feed conveyor is permitted to rotate about points A and B. This permits the feed conveyor 14 to remain relatively stable during operation.

The entire feed conveyor 14 preferably maintains a generally upward angle, as indicated in FIG. 1. The belt 42 of the feed conveyor 14 travels in an upward direction, so as to move harvested produce from the front of the feed conveyor 14 upward toward the lift conveyor 16.

Figure 2:
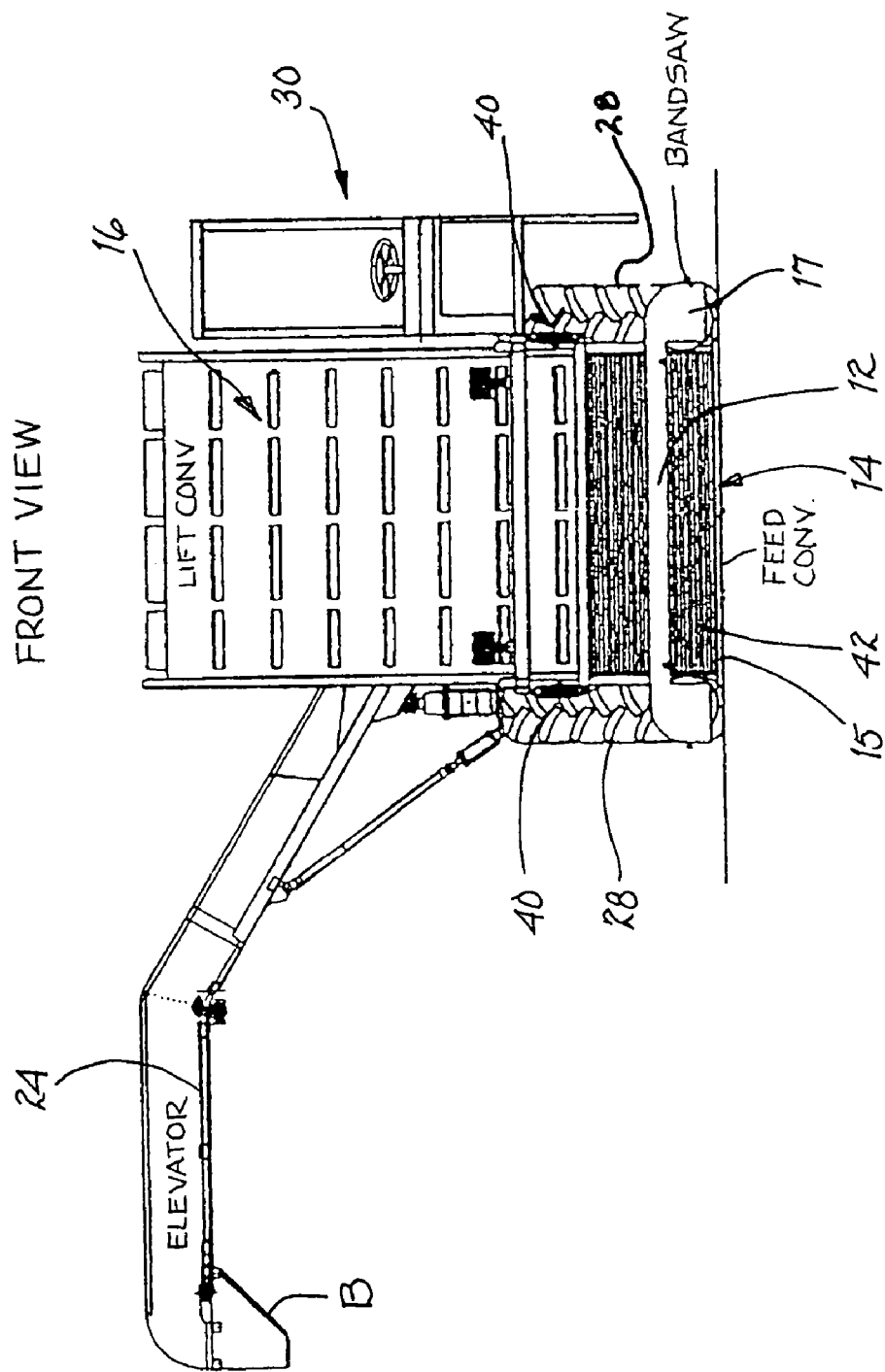
FIG. 2 is a front view of the lettuce harvesting apparatus of FIG. 1.

Turning now to the lift conveyor 16, as shown in FIGS. 1 and 2, it is preferably oriented in an upward direction, when viewed moving backward along the apparatus 10 from the feed conveyor 14. The feed conveyor 14 is preferably oriented at about a 45 degree angle. The belt 44 of the feed conveyor 14 preferably has a plurality of outwardly projecting steps 46. The purpose of the steps 46 is to prevent the produce from falling backward as it is moved upward along the lift conveyor 16.

The lift conveyor 16 is preferably slidably retained on a frame 11 on the main body of the apparatus 10, and may be raised or lowered along the frame 11 by activation of a hydraulic cylinder (not shown). Raising or lowering of the lift conveyor 16 along the frame 11 will also cause the feed conveyor 14 to be raised or lowered as well, by virtue of the herein-described coupling of the feed conveyor 14 to the lift conveyor 16. In this manner, it is possible to raise or lower the exposed cutting blade 15, so as to position it at the desired height for optimum cutting.

For purposes of describing the leveling feature of the apparatus 10, attention is now drawn to hydraulic cylinders 13 (only one of which is shown), which couple between axle 35 and the substantially L-shaped member 37. When it is desired to adjust the horizontal level of the exposed cutting blade 15, typically because of the terrain of the area to be harvested, such leveling can be accomplished by the individual extension or contraction of the hydraulic cylinders 13, which will have the effect of rotating the substantially L-shaped members 37 about point B and thereby raising or lowering the side of the feed conveyor 14 proximate the activated hydraulic cylinder 13.

Figure 3:
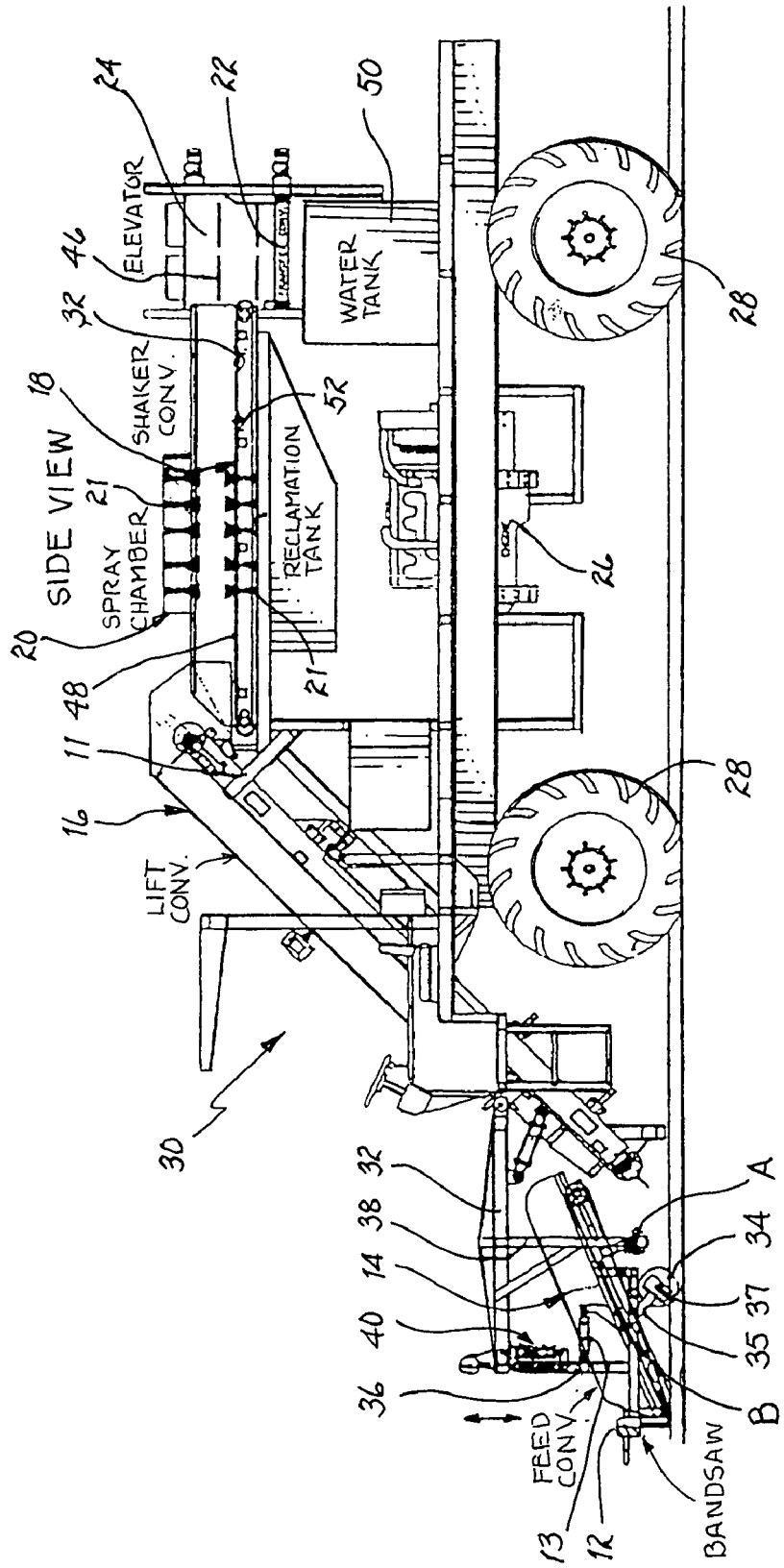
FIG. 3 is a side view of another embodiment of the lettuce harvesting apparatus used in the method of the present invention.

When the produce reaches the topmost point of the lift conveyor 16, it will pass to the washing conveyor 18. As the produce moves along the washing conveyor 18, it will pass through a washing station 20. Referring now to FIG. 1, the washing station 20 in one embodiment consists of a plurality of spray nozzles 21 located above the washing conveyor 18, so as to spray water downward onto the produce passing below. Referring now to FIG. 3, the washing station 20 in another embodiment consists of a plurality of spray nozzles 21 located above the washing conveyor 18 and a plurality of spray nozzles 21 located below the washing conveyor 18. In this embodiment, the produce is sprayed from above and below. (In the embodiment shown in FIG. 3, the belt 48 will need to be configured so as to permit the passage of water therethrough, such as by forming holes in the belt 48. The water sprayed through the spray nozzles 21 is preferably stored in water tank 50.

Referring now to FIG. 1, in one embodiment, a portion of the washing conveyor 18 may be left exposed from the top thereof, so as to permit one or preferably two persons 29 to be positioned there. From that position, the persons 29 may inspect the produce as it passes along the washing conveyor 18, for purposes of quality control. Alternatively, or in combination with the inspection step, one or more persons 29 could remove harvested produce (or a portion of harvested produce—e.g., the heart or the leaves) from the washing conveyor 18 for packaging. (It should be noted that it would also be possible to position the exposed portion after the washing station 20.)

Referring now to FIG. 3, in one embodiment, a plurality of shaker bars 52 are positioned below the belt 48, and oriented so that movement of the shaker bars 52 causes shaking of the belt 48. This shaking movement will cause some of the water remaining on the produce after its passage through washing station 20 to be removed. Referring now to FIGS. 1 and 3, from the end of the washing conveyor 18, the produce will pass to a transfer conveyor 22, which is preferably oriented at a right angle to the washing conveyor 18. The transfer conveyor 22 will move the produce to the elevator conveyor 24. Like the lift conveyor 16, the elevator conveyor 24 preferably has a plurality of outwardly projecting steps 46 thereon so as to prevent the produce from falling backward as it travels upward. At the terminus of the elevator conveyor 24, at exit point B, the produce is dumped into a receptacle (not shown), which may be a truck bed or other suitable vessel.

The method of harvesting produce in accordance with one embodiment of the present invention comprises:

providing a mobile harvesting apparatus travelling on a plurality of wheels and powered by an engine;

wherein a bandsaw is positioned at a front portion of a feed conveyor located on said mobile harvesting apparatus;

wherein said bandsaw has an exposed cutting blade located at an appropriate height for harvesting produce;

wherein a lift conveyor is positioned on said mobile harvesting apparatus so as to receive harvested produce exiting said feed conveyor;

wherein said lift conveyor is slidably retained on said mobile harvesting apparatus;

wherein said lift conveyor and said feed conveyor are rotatably coupled to each other, so that sliding of said lift conveyor adjusts a vertical position of said bandsaw;

harvesting produce with said bandsaw;

receiving said harvested produce on said feed conveyor; and receiving said harvested produce, after it exists said feed conveyor, on said lift conveyor.

While the invention has been particularly shown and described with reference to preferred embodiments thereof, it will be understood by those skilled in the art that the foregoing and other changes in form and details may be made therein without departing from the spirit and scope of the invention. For example, it may be possible to operate the feed conveyor 14 with the bandsaw 12 as a stand-alone unit, so as to achieve the advantage of automated cutting of the produce—and then performing the washing and loading steps separately. Moreover, the feed conveyor 14 and lift conveyor 16 could be combined into a single conveyor. Still further, it would be possible to eliminate the transfer conveyor 22, and instead to configure the elevator conveyor 24 in combination with the steps 46 so that produce could pass directly from the washing conveyor 18 to the elevator conveyor 24 without falling backward. Yet further, it would be possible to eliminate both the transfer conveyor 22 and elevator conveyor 24, with dumping of the produce taking place at the terminus of the washing conveyor 18.

We claim:

1. A method of harvesting produce comprising:
   providing a mobile harvesting apparatus travelling on a plurality of wheels and powered by an engine;
   wherein a bandsaw is positioned at a front portion of a feed conveyor located on said mobile harvesting apparatus;
   wherein said bandsaw has an exposed cutting blade located at an appropriate height for harvesting produce;
   wherein a lift conveyor is positioned on said mobile harvesting apparatus so as to receive harvested produce exiting said feed conveyor;
   wherein said lift conveyor is slidably retained on said mobile harvesting apparatus;
   wherein said lift conveyor and said feed conveyor are rotatably coupled to each other, so that sliding of said lift conveyor adjusts a vertical position of said bandsaw;
   harvesting produce with said bandsaw;
   receiving said harvested produce on said feed conveyor; and
   receiving said harvested produce, after it exists said feed conveyor, on said lift conveyor.

* * * * *